United States Patent [19]
Campbell et al.

[11] 3,922,337
[45] Nov. 25, 1975

[54] HYDROGEN

[75] Inventors: John Stewart Campbell; Patrick Craven; Phineas Davies, all of Stockton-on-Tees, England

[73] Assignee: Imperial Chemical Industries Limited, London, England

[22] Filed: Dec. 19, 1972

[21] Appl. No.: 316,566

Related U.S. Application Data

[63] Continuation of Ser. No. 60,615, Aug. 3, 1970, abandoned.

[30] Foreign Application Priority Data
July 22, 1970 United Kingdom............... 35513/70

[52] U.S. Cl................................. 423/656; 423/437
[51] Int. Cl.$^2$........................ C01B 1/02; C01B 1/03
[58] Field of Search.................... 423/656, 437, 240; 252/468

[56] References Cited
UNITED STATES PATENTS

| | | | |
|---|---|---|---|
| 3,278,266 | 10/1966 | Welch et al.......................... | 423/240 |
| 3,303,001 | 2/1967 | Dienes................................ | 423/656 |
| 3,514,261 | 5/1970 | Bridges et al....................... | 423/437 |
| 3,529,935 | 9/1970 | Lorenz et al........................ | 423/437 |
| 3,546,140 | 12/1970 | Gutmann et al.................... | 423/656 |

Primary Examiner—Edward Stern
Attorney, Agent, or Firm—Cushman, Darby & Cushman

[57] ABSTRACT

Although low-temperature carbon monoxide shift catalysts containing copper and zinc oxide and possibly other oxides have been used industrially for some years, their use has given difficulties due to unexplained losses of activity. It has now been found that such loss of activity can be prevented by use of a guard material more basic than zinc oxide, such as alkalised alumina, or preferably by using a catalyst bed in two parts, the inlet part of which contains alkali above the limit normally acceptable for low temperature shift catalysts.

6 Claims, No Drawings

HYDROGEN

This is a continuation of application Ser. No. 60,615 filed Aug. 3, 1970, now abandoned.

This invention relates to a process for producing hydrogen by reacting carbon monoxide with steam over a catalyst active at below 300°C, and especially to such a process forming part of a combination of steps including, upstream of the carbon monoxide/steam reaction stage, a high temperature reaction of a carbonaceous feedstock with steam.

The production of hydrogen by the catalytic shift reaction of carbon monoxide with steam has been carried out since the first decade of this century but the catalysts used, most commonly containing iron oxide, have been active only at temperatures above about 350°C, at which the concentration of carbon monoxide cannot be economically decreased below about 3%. More recently the shift reaction has been carried out at lower temperature e.g. 170°–300°C and has enabled the carbon monoxide content to be economically decreased to 0.5% or less, such that it can be finally removed by methanation without incurring excessive hydrogen loss. Catalysts for the low temperature shift reaction have been known for many years, but their industrial use has become gradually more practicable only as the problems of manufacturing them and using them have been overcome by such measures as choice of promoter oxide and avoidance of sulphur poisoning, respectively. Despite the precautions which are now taken, low temperature shift catalysts still have a reputation for losing activity in use. Since it is still quite common for manufacturers of such catalysts to have to replace batches because performance guarantees were not fulfilled, it is evident that uncontrolled factors must still be at work.

We have found that poisoning by halogen, especially chlorine, is one of such hitherto uncontrolled factors and that the shift catalyst can be protected from it by means which forms the basis of this invention.

According to the invention a process for producing hydrogen comprises contacting carbon monoxide with steam over a solid material which is more basic than zinc oxide and then over a low temperature shift catalyst.

The solid material more basic than zinc oxide conveniently can be a basic compound of any element of Group IA or Group IIA of the Periodic Table (other than beryllium) or of any other element, such as manganese, having a compound which is basic enough. Preferably the compound should be an oxide, hydroxide or a carbonate, so as not to introduce interfering by-products into the reaction system. Since the quantity of halogen present and the quantity needed to poison the catalyst are extremely small it is often sufficient to use an alkali metal or alkaline earth metal compound or adsorption complex of an inorganic polymer such as a clay, or even an ion exchange resin. Which basic compound is used depends on how the solid basic material is brought into contact with the gas containing carbon monoxide and steam, as will be described in detail hereinafter. The basic material is very conveniently used as a composition in which it is supported on a catalyst carrier material. For example alkalised alumina particles can be used; the alumina preferably has a moderate specific surface (that is, 5–200 m$^2$/g) and the alkali concentration is preferably in the range of 0.5 to 5% calculated as sodium oxide.

In one form of the invention the solid material more basic than zinc oxide is disposed in a guard bed upstream of the low temperature shift catalyst. It is common practice to provide a space for a desulphurisation guard bed, usually consisting of zinc oxide, just upstream of the low temperature shift catalyst: it is convenient to use this space for a halogen-absorbing mass according to the invention if it is not in fact used for desulphurisation, or to replace the desulphurisation mass wholly or partly by the halogen-absorbing mass.

As an alternative the bed of basic material in particulate form may lie immediately upon the bed of low temperature shift catalyst or the particles of basic material may be mixed with the particles of low temperature shift catalyst. For this arrangement the particles of basic material may be of a size such that they can be readily separated from the shift catalyst by for example sieving.

In a preferred form of the invention the low temperature shift catalyst itself contains a proportion, preferably up to 25%, e.g. 0.1 to 20% by weight of the total mixture, of a compound of a metal from Groups II to VII of the Periodic Table whose oxide is more basic than zinc oxide, in addition to copper, zinc oxide and preferably at least one further oxide of a metal from Groups II to VII of the Periodic Table whose oxide is difficulty reducible and is less basic than zinc oxide.

In an important form of the invention a catalyst bed is used in which a low temperature shift catalyst containing copper and zinc oxide (and preferably also an oxide of a metal from Groups II to VII of the Periodic Table) and a quantity of an alkaline compound of an alkali metal equivalent to sodium oxide content between 0.25 and 1%, especially 0.3 and 0.6% forms the inlet portion of the bed. The remainder of the bed contains a low temperature shift catalyst containing less than 0.25% of alkali calculated as sodium oxide. This form of the invention departs from the normal practice in low temperature shift technology, in which alkali contents greater than corresponding to 0.25% sodium oxide are considered undesirable owing to the shortened catalyst life which has been attributed to the alkali.

The alkali of the inlet portions of the catalyst can be introduced for example as the carbonate, bicarbonate, hydroxide or as a compound which decomposes thereto under shift reaction conditions. It may be introduced by deliberate addition to a low-alkali catalyst or, if the catalyst is made by way of a precipitation involving an alkali metal compound such as a carbonate, may be allowed to remain in the precipitate by adopting a less rigorous washing procedure.

Other basic compounds which may be used as constituents of the shift catalysts at least for use at the inlet end of the catalyst bed are oxides of magnesium, calcium, strontium or barium and manganese. If calcium, strontium or barium oxide is used, its concentration can be for example, 0.2 to 0.5%. These basic compounds may be present, for example, as divided solid oxide, hydroxide or carbonate.

When the shift catalyst contains copper and zinc oxide, its proportions need not be changed from those which have been recently proposed or used, for example containing up to about 70% of copper by metal atoms of the total copper and zinc, especially 10–50% copper. Usually zinc is in excess of copper, especially up to a ratio of about 6 : 1 by atoms, and commonly about 1.5 to 2.5. Suitable shift catalysts and low temperature processes using them are described in UK Patent 1131631.

The invention is especially applicable to low temperature shift processes when applied to the gas produced by reacting a carbonaceous feedstock with steam at high temperature, passing the crude gas through a waste-heat boiler and then subjecting the gas to further processing steps to convert it into synthesis gas or hydrogen for hydrogenations. Since an over-all process of this type is made more viable and economic by using the process of the invention, the over-all process also is an embodiment of the invention. In particular, thus, the invention provides a process for producing hydrogen in which a hydrocarbon feedstock is endothermically reacted with steam at a temperature in the range 600°–1000°C, to give a gas containing carbon monoxide and hydrogen, the gas is passed through one or more waste-heat boilers in which it gives up sensible heat, the gas is cooled to shift inlet temperature, the cooled gas is subjected to shift conversion over a copper-containing catalyst at an outlet temperature of under 300°C, and the shift outlet gas is treated to remove carbon dioxide and catalytically methanated to convert any residual carbon oxides to methane, characterised in that low temperature shift catalyst is protected from poisoning by traces of halogen in the gas by contacting the gas with a solid material more basic than zinc oxide.

Such a process can be based on a gaseous feedstock such as methane or butane or refinery gas or a liquid feedstock such a naphtha. The endothermic reaction with steam can be in a single stage, such as by tubular steam reforming, non-catalytic partial oxidation or catalytic partial oxidation; preferably it consists of an initial tubular steam reforming stage, followed where appropriate by secondary reforming in the presence of added air, whereby the nitrogen required for ammonia synthesis gas is introduced. The waste heat recovery section may produce steam at substantially above process pressure, for example at 1000–2000 psig when the process is operated at 150–600 psig. The gas can be cooled to shift inlet temperature by the waste-heat boilers alone or part of the cooling may be effected by means of quench steam or water. A high temperature (e.g. 35°–500°C) shift stage over for example an iron-chromia catalyst may be used before the low temperature shift stage in order to decrease the carbon monoxide content of the gas to a level - about 1–4% - at which the low-temperature shift catalyst may be used without an excessive temperature rise. Often the gas is cooled between the high temperature and low temperature shift stages by means of a waste heat boiler or boiler feed water heater.

EXAMPLE 1

A guard material was made by impregnating 600g. of cylindrical pellets of gamma alumina (3/16 by 3/16 inch) at room temperature with 240 ml. of a solution containing 10.6 g. of sodium hydroxide. The pellets were dried, then calcined at 700°C. Their sodium oxide content was 1.2% w/w and their specific surface 60 square metres per gram.

The pellets were tested for chlorine-absorption by charging them to a laboratory tubular reactor as 5 successive beds separated by glass wool, then passing over them a shift inlet gas having the dry gas percentage composition by volume,

| | |
|---|---|
| $H_2$ | 60 |
| $N_2$ | 20 |
| $CO_2$ | 16 |
| $CO$ | 4 | and a steam ratio 0.5, at a space velocity of 12000 hour$^{-1}$, the temperature being 230°C and the pressure atmospheric. The steam contained 10 ppm of natural chloride and 0.25 ppm of Cl-36, both forms being introduced as hydrochloric acid into the water feed to the capillary boiler from which the steam supply was derived. After 7 day's running, during which the chlorine content of the water condensed from the outlet gases was just detectable (one millionth of a part per million), the gas flow was stopped and the 5 absorption beds analysed: for the analysis the beds were washed by boiling repeatedly with potassium hydroxide solution, whereafter the dissolved chlorine contents were estimated by liquid scintillation counting. From these chlorine contents the bed chlorine contents were calculated to be as follows:

| Bed | 1(inlet end) | 2 | 3 | 4 | 5(outlet end) |
|---|---|---|---|---|---|
| Cl% | 0.37 | 0.33 | 0.0033 | 0.0012 | 0.0007 |

It is evident that chloride is tenaciously absorbed by the alkalised alumina and would be prevented from reaching any catalyst downstream of it.

EXAMPLE 2

Two beds of commercially available copper/zinc oxide/alumina low temperature shift catalyst were set up in parallel, one being preceded by a guard bed of sodium hydroxide/alumina as described in Example 1, the other by a bed of alumina to which alkali had not been added.

Then the same gas mixture as was used in Example 2 without, however, any deliberate chlorine addition, was passed over the two beds at atmospheric pressure, a temperature of 230°C and a space velocity of 15000 hour$^{-1}$. The outlet gas was analysed for carbon monoxide and the results used to calculate a first-order reaction velocity constant (reciprocal seconds) representing the activity of the catalyst. The Table shows the variation of activity during a run of lasting 360 hours.

TABLE.

| Time (hours) | | 3 | 20 | 69 | 95 | 196 | 360 |
|---|---|---|---|---|---|---|---|
| Activity Sec$^{-1}$ | without guard bed | 7.8 | 6.5 | 5.4 | 4.7 | 4.1 | 3.8 |
| | with guard bed | 7.5 | 7.1 | 6.1 | 5.9 | 5.6 | 6.2 |

It is evident that the guarded catalyst has maintained its activity to a substantially better extent than the unguarded catalyst.

EXAMPLE 3

In an ammonia plant in Canada which included a natural gas/steam reforming stage, a high-temperature shift stage, a cooler, a low temperature shift stage, a $CO_2$- removal stage and a methanation stage, the charge of substantially alkali-free low temperature shift catalyst, which had lost activity down to 25% of its initial level over a period of less than one year was replaced by a two-part charge of a catalyst comprising copper oxide(33%), zinc oxide (53%) and alumina (14%). The inlet portion of the charge (14% of the total volume) contained 0.5% of alkali calculated as Na$_2$O. The remainder contained only 0.09% of alkali calculated as Na$_2$O.

The low temperature shift stage was operated at an inlet temperature of 216°C, pressure 350 psig, steam-gas ratio of 0.55 and dry gas space velocity of 3000 hour$^{-1}$. The inlet carbon monoxide concentration was 2.5% on a dry gas basis and the outlet carbon monoxide concentration was 0.16%.

After 24 months' service the performance of the low temperature shift stage had undergone no measurable change.

We claim:

1. In a process for producing hydrogen which comprises contacting carbon monoxide with steam over a copper-containing/low temperature shift catalyst which includes copper and zinc oxide, the improvement whereby poisoning of the shift catalyst by halogen present in the reactants is avoided, said improvement comprising first passing the carbon monoxide and steam over an inorganic oxidic solid material which is more basic than zinc oxide before passing the reactants over the shift catalyst.

2. The process according to claim 1 in which the material is alkalized alumina.

3. The process according to claim 1 in which the catalyst itself contains from 0.1 to 25% of a compound of a metal from Groups II to VII of the Periodic Table whose oxide is more basic than zinc oxide, in addition to copper and zinc oxide.

4. The process according to claim 1 in which a catalyst bed is used which comprises at its inlet portion a low temperature shift catalyst containing copper and zinc oxide and a quantity of an alkaline compound of an alkali metal equivalent to a sodium oxide content between 0.25 and 1.0%, and for the remainder a low temperature shift catalyst containing less than 0.25% of such alkaline compound.

5. The process according to claim 1 wherein the catalyst is a copper/zinc oxide/alumina low temperature shift catalyst.

6. The process according to claim 5 in which the material is alkalized alumina.

* * * * *